April 18, 1961 T. A. REILLY ET AL 2,980,754
CELL EXHAUSTION INDICATOR
Filed March 23, 1959
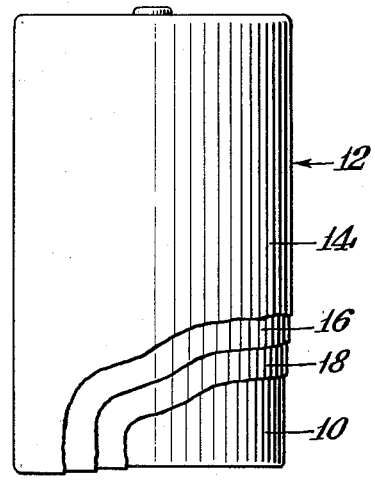
INVENTORS
THOMAS A. REILLY
WILLIAM M. McNEILL
BY John F. Hohmann
ATTORNEY

United States Patent Office 2,980,754
Patented Apr. 18, 1961

2,980,754
CELL EXHAUSTION INDICATOR

Thomas A. Reilly, Cleveland, Ohio, and William M. McNeill, Plandome Manor, N.Y., assignors to Union Carbide Corporation, a corporation of New York Filed Mar. 23, 1959, Ser. No. 801,046

5 Claims. (Cl. 136—182)

This invention relates to primary galvanic cells, and it more particularly relates to the provision of a cell exhaustion indicator for use with primary galvanic cells.

One of the most exasperating problems encountered by manufacturers and consumers of primary galvanic cells is that of detection of exhausted cells. This problem has never been solved with any degree of commercial success primarily because no one has been able to find a way to incorporate a simple exhaustion indicator into such a cell without detracting from its salability and efficiency and without changing the appearance and/or the size of these cells. Another important consideration in providing such an indicator which has not been met with any degree of success is the requirement that it be inexpensive and readily adapted to mass production techniques. The usual primary galvanic cell is suitably encased in steel, paper, or plastic in order to improve the appearance thereof and then if needed suitably packaged to prevent the electrolyte thereof from contacting the appliance powered by the cell. In any of the above instances, the further encasement of the cell in other materials does not prevent the perforation of the consumable anodic container but merely prevents the electrolyte from doing immediate damage to the apparatus. It is important to many trades not to allow a cell to get close enough to exhaustion so that electrolyte leakage occurs. Among the most important of these trades are firemen and railroad signalmen. To these people it may be a matter of life or death whether the cells they depend upon are in operating condition.

It is therefore the principal object of this invention to provide a simple cell exhaustion indicator.

It is another object of this invention to provide a cell exhaustion indicator which is an integral part of the cell construction.

It is a further object of this invention to provide a cell exhaustion indicator which will not detract stability or performance from the existing cell structure.

Fulfilling these objects, this invention comprises placing a relatively thin layer of a material which changes appearance on contact with cell electrolyte between a consumable metal anodic cell container and a transparent wrapper for the cell.

This invention will be more particularly described with relation to the accompanying drawing which is an elevation of a flashlight cell made according to this invention, part being broken away.

With reference to this drawing, the consumable metal anodic cell container 10 of a primary galvanic cell 12 is suitably wrapped with a transparent wrapper 14 generally having advertising matter printed thereon. A relatively thin layer 16 of material which changes appearance upon contact with cell electrolyte disposed adjacent the wrapper 14 acts as the cell exhaustion indicator. The layer 16 is suitably separated from the cell container 10 by insulation 18, thus preventing short circuiting of the cell. The layer, to be more fully described below, is preferably a metal which may be laminated, vacuum metallized, or vapor deposited onto the transparent wrapper 14. In the alternative, the layer 16 may be provided as foil between the wrapper 14 and the insulation 18.

This layer actually acts as the cell exhaustion indicator because, as the anode is consumed producing electricity, small holes, which occur therein due to the galvanic action of the cell, provide openings through which electrolyte may reach the outside of the anodic cell container. The electrolyte may then be soaked through the insulating material into contact with the indicating layer above referred to. When the electrolyte makes contact with the indicating layer, a reaction takes place consuming at least a portion thereof and leaving a white reaction product which contrasts very well with the metallic lustre of the rest of the layer as seen through the transparent wrapper.

As soon as these white portions appear, the user is apprised of the fact that the cell is either exhausted or very nearly so and should be replaced in order to obtain continued dependable performance from the appliance which the cell has been powering.

While it is advisable to use an absorbent insulator which will provide ready access for electrolyte to reach and react with the indicating layer, such is not essential and even water-proofed paper can be used. Treated or water-proofed paper generally enhances shelf life of a cell by delaying moisture loss. In the case of excess perforation of the anodic cell container such as is encountered when a cell is discharged under heavy drain conditions, the electrolyte will force its way through or around even treated paper insulators. It is preferred to use a transparent wrapper which is resistant to the electrolyte since it is desirable to contain it within the confines of the cell container indefinitely. If, however, the cell is in such position that it is readily observable at all times, and if the presence of electrolyte would not be objectionable to the appliance being powered, it would then be unnecessary to use this wrapper for protective purposes since the cell could then be replaced before the electrolyte got into the appliance. It is also within the intended scope of this invention that advertising or other visual material may be printed on the transparent wrapper. Preferably such should be reverse printed on the inside of the wrapper in order to insure against it rubbing off or becoming obscured during ordinary handling. If it is desired to form the indicating layer of metal by vacuum metallizing or vapor deposition on the transparent wrapper, the printing must be accomplished prior to this forming.

As an additional incidental advantage, the construction herein described forms a highly attractive cell covering. The metallic lustre of the metal film or strip forms an excellent background for the advertising matter which is generally printed on the surface of or reverse printed on the inside of the transparent wrapper. It has been found that this combination has excellent sales appeal and customer acceptance has been high.

Usually the indicator, which is the subject of the instant invention, is designed for use with consumable zinc, magnesium or aluminum anodic cell containers but any other consumable anodic container type of cell would be benefited by use of this invention. The wall of the anodic cell container may be modified by purposely thinning, marking or indenting such so as to cause electrolyte to contact the indicating layer prior to cell exhaustion. This practice is particularly advantageous where it is desired to use a water-proofed or treated insulator since the use of such an insulator generally delays detection of cell exhaustion. Similarly, while the metallic layer may be of any metal which will change appearance when attacked by the cell electrolyte, an aluminum layer has been found to give excellent indicator results, especially with Leclanche cells, and therefore the use of this metal is preferred. Cellulose acetate has been found admirably suited to use as a wrapper material because it is transparent and may be printed upon. Other materials which may be used as equivalents of the acetate include polyester, vinyl, styrene, or other plastic films capable of retaining the cell electrolyte. It is also possible to use molded or extruded transparent containers of plastic or even glass.

As a specific example of the practice of this invention, a "D" size flashlight cell, having an amalgamated consumable zinc anodic can, a bibulous separator containing zinc chloride-ammonium chloride electrolyte thickened with starch and flour, manganese dioxide cathode-depolarizer mix, and a carbon cathode-collector was inserted into a spirally wound paper tube. A reverse printed cellulose acetate wrapper about 1 mil thick was given a 30 Angstrom coating of aluminum, by a vacuum metallizing technique, on the inside surface thereof over the printed matter thereon. The cell was then provided with this metallized wrapper.

The cell, as thus constituted, as well as others similarly made, were tested on a 2.25 ohm continuous discharge. It was found that a white haze appeared in the usual metallic lustre of the aluminum after two days, thus indicating attack of electrolyte on the vacuum metallized aluminum.

These tests were carried out using untreated paper as the spirally wound insulating tube mentioned above but similar tests run on cells having water-proofed paper insulation showed the same effect upon discharge.

What is claimed is:

1. In a primary galvanic cell, the combination indicating exhaustion thereof which comprises a consumable anodic container for said cell, a transparent wrapper adjacent to and coextensive with said anodic container, and a metallic layer, which substantially changes appearance upon contact with cell electrolyte, between said wrapper and said container, said layer being insulated from said container.

2. In a primary galvanic cell, the combination indicating exhaustion thereof which comprises a consumable anodic container for said cell chosen from the group consisting of zinc, aluminum and magnesium, a transparent wrapper therearound, and a metallic layer which changes color upon contact with cell electrolyte, between said wrapper and said container, said layer being insulated from said container.

3. In a primary galvanic cell, the combination indicating exhaustion thereof which comprises a consumable metal anodic container for said cell, a transparent liquid-impervious wrapper therearound, and aluminum foil between said wrapper and said container, said foil being insulated from said container.

4. In a primary galvanic cell, the combination indicating exhaustion thereof which comprises an amalgamated zinc anodic container for said cell, a reverse-printed cellulose acetate wrapper therearound, and an aluminum layer between said wrapper and said container, said aluminum layer being insulated from said container.

5. In a primary galvanic cell, the combination indicating exhaustion thereof which comprises a consumable metal anodic container for said cell, a transparent wrapper therearound, and a metallic layer, which changes color upon contact with cell electrolyte, between said wrapper and said container, said metallic layer being separated from said container by a paper insulator.

References Cited in the file of this patent

UNITED STATES PATENTS

| 665,679 | Hall | Jan. 8, 1901 |
| 1,017,064 | Smith et al. | Feb. 13, 1912 |
| 1,497,388 | Sterling | June 10, 1924 |

FOREIGN PATENTS

| 528,077 | Great Britain | Oct. 22, 1940 |